March 29, 1960 R. S. JOSE 2,930,846

TELEVISION TRANSMISSION

Filed March 19, 1954

INVENTOR.
Robert S. Jose
BY
ATTORNEY

United States Patent Office 2,930,846
Patented Mar. 29, 1960

2,930,846

TELEVISION TRANSMISSION

Robert S. Jose, Moorestown, N.J., assignor to Radio Corporation of America, a corporation of Delaware Application March 19, 1954, Serial No. 417,468
5 Claims. (Cl. 178—7.1)

Figures 1, 2:
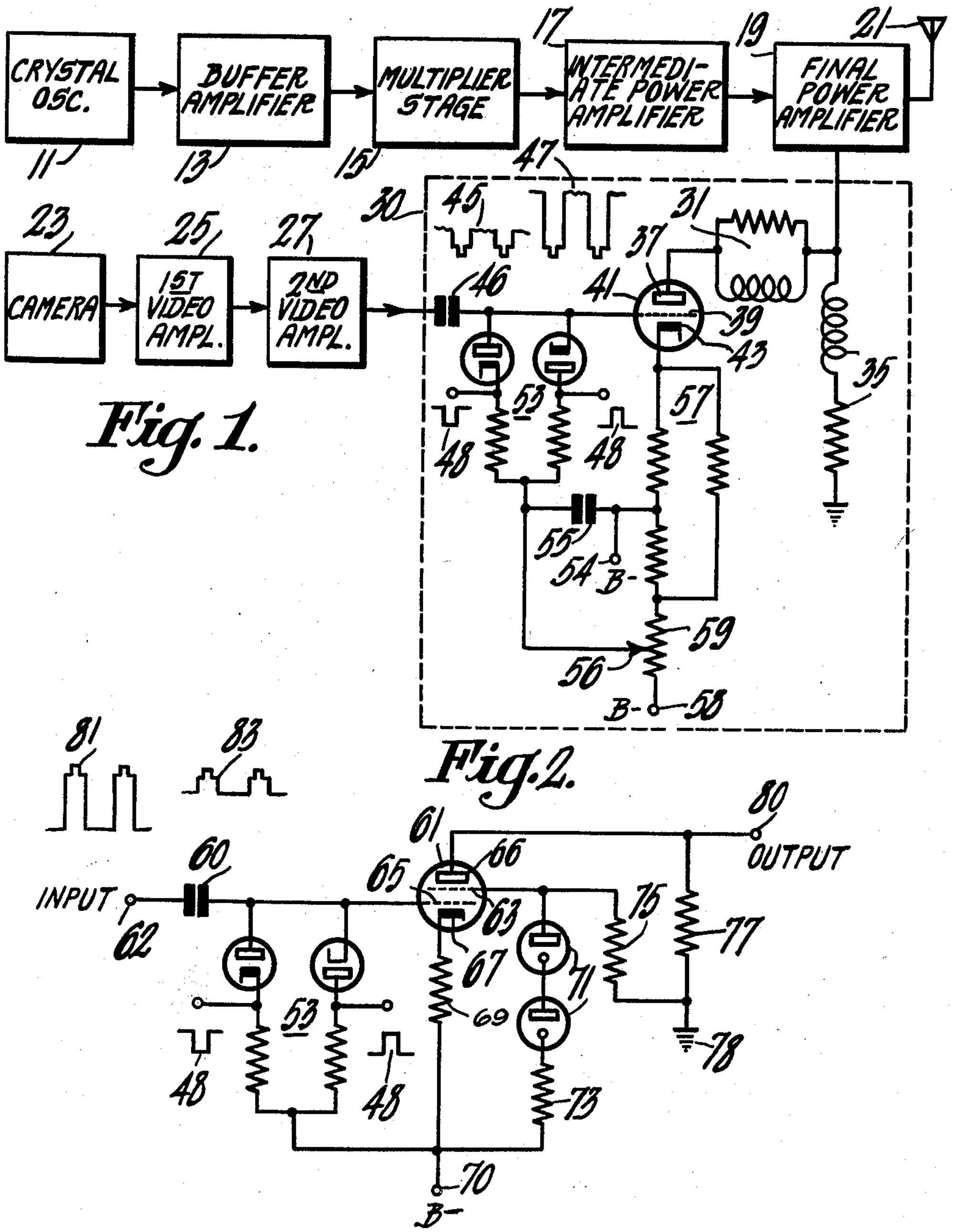

This invenion relates to television transmitters, and more particularly to an improved arrangement for maintaining the peak signal amplitude power output of a television transmitter uniform regardless of the magnitude of the D.C. component in the image signal.

A direct current component of a television signal is that portion of a television signal which contains information concerning the light level in a televised scene. The less intense the light which luminates a scene to be televised, the greater the D.C. or average component of the transmitted television signal. If this method of setting the light intensity level were not provided, the highlights of the scene would tend to fade into a gray light level, and gray portions of the scene would disappear into black. The D.C. level of the television signal is therefore set by clamping a recurring portion of the wave, such as the back porch of the sync signal, to a particular light level. In transmitting a television signal, the transmission of predominantly dark or gray pictures requires greater power than the transmission of predominantly light or brighter pictures. The power difference is due to the varying level of the D.C. signals component of the television signal. During a period of transmission of a bright picture the D.C. signal component of the television signal is low, and therefore the power required is low, during a period of transmission of a gray or dark picture the D.C. signal component is high and therefore power requirements placed on the transmitter are increased.

The RTMA specifications regulate within fairly narrow limits the allowable variation in the carrier pedestal level and the peak signal amplitude which forms the synchronizing pulse of a television signal. At a time when a television transmitter is delivering a large power output, the co-acting effects of the lack of voltage regulation and variation caused by increased grid current in the final amplifier cause the peak amplitude of the signal to drop. Because of supply voltage variation due to increased power demand, and output variations due to grid current, it becomes necessary to devise some means to hold the peak signal amplitude at a value such that the variation does not exceed that allowable by the regulations of the RTMA specifications. A partial solution to this problem in the past has been to utilize a highly regulated power supply for the transmitter, thereby introducing no voltage decrease in the power supply with increased power output. The use of a highly regulated power supply in a television transmitter, however, becomes quite bulky and expensive in view of the voltages encountered in such power supplies.

According to the invention in its more general form compensation of peak power output fluctuations created by the presence of a high direct current component in a video signal is effected by developing a compensating voltage which varies as the direct current content of the video signal under transmission, and using the developed compensating voltage to vary the current through one of the video stages in such a manner as to maintain substantially constant peak signal amplitude power output of the television transmitter regardless of the magnitude of the D.C. component of the picture.

An object of this invention is to provide improved method and apparatus for maintaining the peak signal amplitude power output of a television transmitter substantially constant regardless of the signal D.C. component.

Another object of this invention is to provide a television transmitter having substantially constant peak signal amplitude power in which a highly regulated power supply is not required.

A further object of this invention is to provide an improved television transmitter.

Other and incidental objects of the invention will be apparent to those skilled in the art from reading the following specification and on inspection of the accompanying drawings in which:

Figure 1 shows a block and circuit diagram of an embodiment of the invention, and Figure 2 shows a circuit diagram of another embodiment of the invention.

Referring to Figure 1, there is shown a block 11 representing a crystal oscillator, the signals generated in the crystal oscillator 11 are fed to a buffer amplifier 13, to be amplified before being fed to a multiplier stage 15. Multiplier stage 15 is connected to intermediate power amplifier 17 which is in turn connected to a final power amplifier 19, which amplifies the carrier wave generated in the previous stages. Block 23 represents a television camera and its necessary accompanying apparatus to convert an image into a video signal, the video signal is amplified first in first video amplifier 25 and then in second video amplifier 27. The amplified video signal is then fed to modulating amplifier 30, which in Figure 1 is shown as the video stage in which this invention is illustrated. However, it is to be understood that this invention could be practiced in any of the video stages or television signal channels of a television transmitter. The video signal from the second video amplifier 27 is coupled by means of a coupling condenser 46 to an impedance control electrode or control grid 39 of electron discharge device 41, electron discharge device 41 having a plate 37 and a cathode 43. A clamping circuit 53 is also connected to the control grid 39 for clamping the television signal to a voltage level representing black. Clamping circuits are well known in the television art and the clamping circuit 53 is shown and described in RCA Review, March 1948, page 102. The function of clamping circuit 53 is to return the voltage on the grid side of coupling condenser 46 to some predetermined voltage during the blanking interval of the television signal and to provide a nearly infinite time constant on coupling condenser 46 during the rest of the television signal. Clamping circuit 53 is operated by keying pulses 48 which occur during the blanking period of the video signal. A cathode 43 of the electron discharge device 41 is connected to a voltage divider 57, which is connected through a potentiometer 59 to a source of negative potential 58. Sliding contact 56 on potentiometer 59 is connected to the clamping circuit 53 such that during the clamping period a portion of the potential developed across the potentiometer 59 will be applied to the coupling condenser 46 thereby setting a black level bias on grid 39. A second source of negative potential 54 is connected to the voltage divider circuit 57, this source of potential is less negative than the source of negative potential 58. Various resistance arrangements could be substituted for voltage divider circuit 57 to provide various degrees of compensation. A condenser 55 is connected between the source of negative potential 54 and the clamping circuit 53. The output of the electron discharge device is coupled to the final power amplifier 19 through a peaking circuit 31 and a grounded load impedance 35. The output of the final power amplifier 19 is then fed to an antenna 21 where the television signal is transmitted.

In the operation of the circuit shown by schematic and block diagram in Figure 1, consider the application of video signals represented by voltage curves 45 and 47 with the polarity shown. Voltage curve 45 represents a video signal of a scene with a low light level or a dark video signal whereas curve 47 represents a signal of a scene with a high light level or a light video signal. The dark video signal represented by curve 45 has a lower signal D.C. component than the light video signal represented by curve 47, therefore electron discharge device 41 will have less average plate current during the application of the dark video signal represented by curve 45 than during the application of light video signal represented by curve 47. It should be borne in mind that the output signals from the modulating amplifier 30 are inverted with respect to the input signals represented by the input voltage curves 45, 47. This means that the dark video signal requires more power for transmission than the light video signal as stated hereinbefore. The operation of the modulating amplifier, while inverse as to power requirements of the final amplifier, is otherwise clearly consistent with the earlier statements. Consider first that the input is the dark video signal represented by curve 45, having a relatively low D.C. signal component, and therefore causing a relatively low average plate current in the electron discharge device 41. When the average plate current in the electron discharge device 41 is comparatively low the voltage developed across the voltage divider 57 and the potentiometer 59 and the voltage at the point of contact of the sliding contact 56 will become more negative. This negative compensating voltage will be applied to the coupling condenser 46 during the clamping period through clamping circuit 53. The effect is therefore to increase the plate voltage of the electron discharge device 41 with the occurrence of a predominantly dark or a blacker picture thereby compensating for the variation due to poor regulation and varying grid current. With the occurrence of a predominantly light picture and its accompanying light video signal represented by curve 47, the D.C. component is high, therefore the average plate current of the electron discharge device 41 is also increased, the increase in average plate current creates an increased current through the potentiometer 59 thereby increasing the voltage drop across potentiometer 59. The increased voltage drop across potentiometer 59 increases the compensating voltage at the point of the sliding contact 56 which is in turn periodically fed back to condenser 46 through the clamping circuit 53, giving control grid 39 a more positive bias, thus decreasing the output voltage of the electron discharge device 41 and compensating for variations in peak signal amplitude power. It can therefore be seen that with the occurrence of a dark video signal or a light video signal the plate voltage is increased or decreased to compensate for the error which occurs with the presence of a light or dark signal.

The invention in another of its forms may be practiced in a video stage where the polarity is inverted with respect to that shown in Figure 1.

Referring now to Figure 2, an input terminal 62 is adapted to receive a television video signal. Coupling condenser 60 applies this video signal to a grid 65 of electron discharge device 61. A clamping circuit 53 is coupled to the grid 65 of the electron discharge device 61, to periodically set the light level of the video signal, upon receiving keying pulses 48. Electron discharge device 61 is also provided with a screen grid 63, a plate 66 and a cathode 67. The cathode 67 is connected to a source of negative potential 70 through cathode resistor 69. The screen grid 63 is connected to the source of negative potential 70 through a voltage regulating device 71 and a compensating potential generating resistance 73.

Screen grid 63 is also coupled to a source of reference potential 78 through voltage dropping resistor 75. An output circuit, comprising a load resistor 77, and an output terminal 80 are connected to the plate 66 of the electron discharge device 61. This embodiment of the invention may be substituted for the circuitry shown in the modulating amplifier 30 of the circuit diagram shown in Figure 1. Polarity reversal necessary for substitutions in the block diagrammed portion of the overall circuit may be accomplished in a number of ways among which are to precede the stage shown in Figure 2 with a cathode follower stage replacing the second video amplifier 27. To understand the operation of the circuit shown in Figure 2, consider first the application to the input terminal 62 a video signal represented by voltage curve 83. With the polarity shown in voltage curves 81 and 83, a video signal which has a high direct current component, as curve 83 represents a video signal of a dark scene. The high direct current value will cause the plate voltage of electron discharge device 61 to drop, thereby increasing the average grid current of the screen grid 63. The current through voltage dropping resistance 75 is divided between the current drawn by the screen grid 63 and the current passing through the voltage regulating device 71. Due to this current division the more grid current drawn by the screen grid 63 the less current will pass through the potential generating resistance 73. An increase in average current through the screen grid 63 will cause a decrease in the average current through the resistance 73, and such will be the case for a predominantly dark picture or one presented by a video signal of high direct current content. As the current through the resistance 73 decreases the voltage across resistance 73 will also decrease. This voltage represents a compensating voltage which will bias the screen grid 63 in accordance with the direct current content of the signal. If the voltage across the resistance 73 goes down it places a lower bias on the screen grid 63 thereby raising the peaks of the video signal and compensating for the variations created by regulation of the power supply and by grid current variations in the final amplifier. Consider now that a predominantly white or light picture is being transmitted, such as signal is represented by curve 81. The direct current component of the curve 81 is low and thus the plate voltage of the electron discharge device 61, will tend to increase, this will be accompanied by a decrease in the grid current drawn by the screen grid 63. As the grid current drawn by the screen grid 63 decreases the current through voltage resistance 75 will increase, thereby increasing the voltage drop across resistance 73. The higher the voltage drop across the resistance 73 goes, the higher the screen grid 63 will be biased, therefore the value of the bias or screen grid 63 increases, the peaks of the video signal will be decreased in accordance with the necessity to compensate for the light picture.

From the foregoing it can be seen that applicant has provided an improved form of a compensation means for maintaining the peak signal amplitude power output of a television transmitter substantially uniform.

Having thus described the invention, what is claimed is:

1. A television transmitter having a video stage comprising an electron discharge device, said electron discharge device having current control means, a potential divider serially connected with said electron discharge device, the potential developed in said potential divider being responsive to the average amplitude of a video signal, and means for periodically applying said potential developed in said potential divider to said current control means to maintain substantially constant peak signal amplitude power output of said television transmitter regardless of variations in the average amplitude of such video signal.

2. A television transmitter modulating amplifier comprising a vacuum tube having a plate, a control grid, and a cathode, an input circuit connected to said grid, a voltage divider circuit connected to said cathode and energized by a source of potential, a low pass filter, signal clamping means having two terminals, said clamping means having one terminal connected to said grid, said low pass filter being connected between the other terminal of said clamping means and a point in said voltage divider circuit at a point remote from said cathode and remote from said source of potential, an output circuit connected to said plate of said vacuum tube.

3. In a television transmitter having a modulating wave amplifier including an electron discharge device having cathode, control and anode electrodes, an impedance element connected between said cathode electrode and a point of fixed potential, means to apply energizing voltage to said anode electrode positive with respect to said fixed potential, a voltage dividing circuit shunted across said impedance element, a potential dividing circuit connected between said voltage dividing circuit and a point of potential negative with respect to said fixed potential and a connection between said potential dividing circuit and said control electrode.

4. In a television transmitter having a modulating wave amplifier including an electron discharge device having cathode control and anode electrodes, an impedance element connected between said cathode electrode and a point of fixed potential, means to apply energizing voltage to said anode electrode positive with respect to said fixed potential, a voltage dividing circuit shunted across said impedance element, a potentiometer connected between said voltage dividing circuit and a point of potential negative with respect to said fixed potential and a connection between the arm of said potentiometer and said control electrode.

5. In a television transmitter having a modulating wave amplifier including an electron discharge device having cathode, control and anode electrodes, a resistor connected between said cathode electrode and a point of fixed potential, means to apply energizing voltage to said anode electrode positive with respect to said fixed potential, a pair of resistors connected in series across said resistor, a potentiometer having one terminal connected to the junction between said series connected resistors, another terminal connected to a point of potential negative with respect to said fixed potential and an arm connected to said control electrode.

References Cited in the file of this patent

UNITED STATES PATENTS

| | | |
|---|---|---|
| 2,292,919 | Barco | Aug. 11, 1942 |
| 2,675,423 | Kirkness | Apr. 13, 1954 |
| 2,792,496 | Rhodes | May 14, 1957 |

FOREIGN PATENTS

| | | |
|---|---|---|
| 506,189 | Great Britain | May 24, 1939 |